United States Patent

[11] 3,617,229

[72] Inventors Gunner E. Nelson;
 Warren E. Becker; Paul Kobetz, all of
 Baton Rouge, La.
[21] Appl. No. 683,462
[22] Filed Nov. 16, 1967
[45] Patented Nov. 2, 1971
[73] Assignee Ethyl Corporation
 New York, N.Y.

[54] PREPARATION OF ALKALI METAL ALUMINUM HYDRIDES
 9 Claims, No Drawings
[52] U.S. Cl. .................................................. 23/365
[51] Int. Cl. .................................................. C01b 6/24
[50] Field of Search ........................................ 23/361,
 365, 204; 260/448; 252/428,431

[56] References Cited
 UNITED STATES PATENTS
3,357,806 12/1967 Dvorak et al. ................ 23/365
3,387,949 6/1968 Snyder ........................ 23/365
 FOREIGN PATENTS
 45,701 11/1966 Germany ...................... 23/365
756,510 4/1967 Canada ........................ 23/365
 OTHER REFERENCES
Zaklarkin, L. T. et al,; Academy of Sciences USSR, Proceedings Chemical Section; Volume 145, 1962 pp. 656–57.

Ruff, John K. et al.; " Journal of the American Chemical Society," Vol. 83, Feb. 1961, pp. 535– 38
Ashby, E. C. et al.; " Inorganic Chemistry," Vol. 2, No. 3, June 1963, pp. 499– 503

Primary Examiner—Oscar R. Vertiz
Assistant Examiner—G. O. Peters
Attorney—Donald L. Johnson ABSTRACT: A process for preparing alkali metal aluminum hydride comprising reacting together an alkali metal, or the hydride thereof, with aluminum having alloyed therewith either Ti or Zr, under hydrogen pressure in the presence of a tertiary amine. Preferably, the catalyst comprises a tertiary amine and a hydrocarbon compound which is capable of being metallized under the reaction conditions, such as triphenylmethane, indene, thiophene, fluorene, and alpha-picoline. Reaction times are reduced to about one-third normal and provides for recycling the catalysts and reaction media in which the reaction is conducted. Sodium aluminum hydride prepared by this method is a good source of high-purity hydrogen for use in fuel cells and the like. Reaction temperatures range from 50°C. to 200°C. under pressures of from 500 to 10,000 pounds per square in (p.s.i.).

PREPARATION OF ALKALI METAL ALUMINUM HYDRIDES

BACKGROUND OF THE INVENTION

1. Field of the Invention

This invention relates to a method for preparing alkali metal aluminum hydrides having the formula $MAlH_4$ wherein M comprises an alkali metal. More particularly, the invention relates to a method for preparing sodium aluminum tetrahydride.

2. Description of the Prior Art

A method of preparing sodium aluminum hydride directly from the elements is the subject of pending U.S. Pat. application Ser. No. 751,862, filed July 30, 1958, owned by the assignee of the present application. Generally, the method comprises contacting sodium, or sodium hydride, and aluminum with hydrogen, at elevated temperatures and pressures, producing sodium aluminum hydride in good yields. One use for the sodium aluminum hydride produced thereby is as a source of hydrogen for certain applications such as fuel cells.

Efforts are continuing to increase the efficiency of fuel cells using as a hydrogen source sodium aluminum hydride. It has been discovered that the level of hydrocarbon contaminants present in the hydrogen generated from the sodium aluminum hydride has a pronounced effect on the efficiency of fuel cells.

In addition to the above, known processes of preparing alkali metal aluminum hydride involve reaction times at least about 16 to 30 hours. In a commercial operation, such lengthy reaction periods are unacceptable. For example, see U.S. 3,290,123, to Del Giudice et al., wherein reaction times are reported to be at least about 16 hours at a temperature of about 175° C. with continuous agitation.

The present invention provides a process for producing alkali metal aluminum hydrides which overcome these and related disadvantages of the prior art.

SUMMARY OF THE INVENTION

We have discovered a novel method of producing alkali metal aluminum hydride from which can be generated hydrocarbon-free, high-purity hydrogen. In addition, reaction times are drastically reduced over those presently known in the art. The method comprises reacting together an alkali metal, or the hydride thereof, and aluminum, the aluminum having alloyed therewith either titanium (Ti) or zirconium (Zr), with hydrogen, under elevated temperatures and pressures, in the presence of a tertiary amine. Preferably, the catalyst comprises (I) a tertiary amine and (II) a hydrocarbon compound which is capable of being metallized under the reaction conditions, such as triphenyl-methane, indene, thiophene, fluorene and alpha-picoline. The reaction is conducted in the presence of a reaction medium. Catalyst and reaction media are recycled upon separation and recovery of the crystalline, solid alkali metal aluminum hydride.

More specifically, the process of the invention comprises heating at an elevated temperature an alkali metal, such as sodium, potassium, rubidium or cesium, or the hydrides thereof, in a confined reaction zone with a finely divided aluminum powder, the aluminum having alloyed therewith a metal selected from the group consisting of titanium (Ti) and zirconium (Zr), in an inert liquid reaction medium in the presence of hydrogen under superatmospheric pressure, in the presence of a catalyst system consisting essentially of 1,4-diazabicyclo(2.2.2) octane and a compound such as triphenyl-methane, indene, fluorene, thiophene, alpha-picoline, and the like, while agitating the mixture until the reaction between aluminum, hydrogen, and the alkali metal, or hydride thereof, is substantially complete, as evidenced by the cessation of hydrogen uptake.

In a continuous process, it would not be necessary for the reaction to go to completion. However, in batchwise preparations, it is customary to conduct the reaction until hydrogen pressure remains constant, evidencing no consumption thereof in the reaction.

The reaction proceeds as follows:

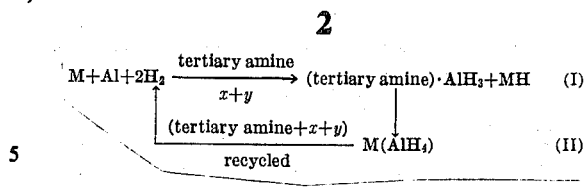

wherein M is an alkali metal; $x$ is a compound selected from the group consisting of triphenylmethane, fluorene, indene, thiophene, alpha-picoline, and the like; and $y$ is a suitable reaction media, preferably one in which the formed alkali metal aluminum hydride is insoluble. The reaction is conducted at a temperature of from about 50° C. to about 200° C. and at pressures ranging from about 500 to about 10,000 p.s.i.

The reaction product of equation (I) is stable only for a time sufficient to allow formation of sufficient quantities of the alkali metal hydride to convert the tertiary amine. $AlH_3$ complex to the alkali metal aluminum hydride. The alkali metal hydride being a stronger base than the tertiary amine, the metal hydride replaces the amine in the complex, freeing the tertiary amine to be recycled in a continuous process, along with the reaction medium and other catalyst components.

DESCRIPTION OF THE PREFERRED EMBODIMENTS

Known processes for preparing alkali metal aluminum hydride utilize aluminum in finely subdivided form. The particles generally range from birdshot size down to a finely divided powder. The powder should pass through a 325-mesh screen to the extent of about 80 percent thereof. When large-size pieces of aluminum are used, it is necessary to ball, mill, or grind the aluminum to achieve activation.

However, in the known processes, activation of aluminum was usually accomplished by the use of an aluminum alkyl. The use of aluminum alkyls has been found to contaminate the alkali metal aluminum hydride resulting in a product from which evolved hydrogen contained unwanted and harmful hydrocarbons.

Therefore, the present invention should utilize an aluminum powder, at least 80 percent of which passes through a 325-mesh screen. It is generally unnecessary to activate the aluminum by the old methods when the powder is used.

To achieve the accelerated reaction times, the aluminum powder should contain either Ti or Zr, alloyed therewith. The Ti and Zr may be present as alloyed impurities in the aluminum, or may be incorporated in the aluminum by known carbothermic reduction means. The amount of Ti or Zr component useful in reducing reaction times ranges from about 50 to about 20,000 parts per million (p.p.m.) based on the weight of the aluminum powder. Preferably, the Ti or Zr component should be present at a level of at least 1,000 p.p.m.

The reaction may be conducted at a temperature between about 50° C. and 200° C. and at a hydrogen pressure between about 500 and 10,000 pounds per square inch (p.s.i.). A more preferable temperature range is between about 100° to about 180° C., the most preferred temperatures ranging between about 140° to about 170° C. Preferred pressures for the invention range between 1,500 to about 4,500 p.s.i., with the most preferred ranging between about 1,500 to about 3,000 p.s.i.

Suitable inert liquid carriers are liquid hydrocarbons, such as hexane, trimethyl hexane, octane, toluene, benzene, hexadecane, o-xylene, dodecane, and cyclohexane; the lower alkyl ethers, such as dimethyl ether, diethyl ether, diisopropyl ether, and dibutyl ether; and other ethers, such as tetrahydrofuran, dioxane, and dimethyl ether of diethylene glycol. While oils, such as Esso Solva 75, are also quite satisfactory. However, preferred reaction media are toluene, hexane, trimethyl hexane, octane, and suitable white oils, with the most preferred being toluene.

The invention is applicable to alkali metals generally, or the hydrides thereof, such as sodium, potassium, rubidium and cesium. However, the most preferred alkali metals are sodium and potassium. When sodium is used, it may be in any suitable form since it is molten at reaction temperatures. The mole ratio of alkali metal to aluminum is preferably about 0.9:3 to about 1.1:1. A slight excess of alkali metal is most preferred, although not absolutely necessary. An excess of aluminum may be used if desired. However, the most suitable mole ratio is from about 1:1 to about 1.1:1.

It has been found that alkali metal aluminum hydride capable of evolving hydrocarbon-free, high-purity hydrogen may be prepared by using as a catalyst a tertiary amine. Various tertiary amines have been found to be especially useful for this purpose, such as, trimethyl amine, triethyl amine, triethylene diamine, tetramethyl ethylene diamine, pyridine, quinoline, and the like. The triethylene diamine is more properly identified as 1,4-diazabicyclo(2.2.2) octane, and has been found to be the most preferable tertiary amine in the present invention. The diazacompound is more conveniently called Dabco and will be often referred to herein by that name.

Dabco is readily available from several manufacturers, one of which is the Aldrich Chemical Company, Inc. It is employed in the invention in an amount ranging from about 0.1 to about 10 weight percent, based on the total weight of alkali metal and aluminum metals charged to the reactor. It is most beneficial to use from about 3.0 to about 7.5 weight percent of the Dabco, since satisfactory yields of alkali metal aluminum hydride and reaction rates are obtainable at this level of use.

In addition to the advantages of using a tertiary amine as the sole catalyst of the invention, it has been found that even better results are obtainable when the tertiary amine is used in combination with a cocatalyst material. A cocatalyst which is suitable for use with the tertiary amines of the invention is selected from the group consisting of triphenylmethane, indene, fluorene, thiophene, alpha-picoline, and the like. The most preferred cocatalyst, due to its ease of handling and availability, is triphenylmethane. The specific examples of cocatalyst useful in the invention are only representative of a large number of acidic hydrocarbons that would be equally useful. Generally, any hydrocarbon compound capable of being metallized under the reaction conditions would be equally suitable herein. The cocatalyst has been found to be useful at a level of from about 0.1 to about 10 weight percent, based on total charged metals. Most beneficial results are obtained when the cocatalyst is used in an amount ranging from about 0.1 to about 7.5 weight percent.

A particularly advantageous combination of catalysts comprises (a) 1,4-diazabicyclo(2.2.2) octane and (b) triphenylmethane. In addition to the combination (a) and (b), hereinabove, it has been found that good results are obtainable when Dabco is combined with alpha-picoline. In addition, alpha-picoline, alone, is effective in catalyzing the reaction of the present invention.

Using the above amounts of catalyst, rates of reaction have been found to be as good as or better than when aluminum alkyls, such as triethyl aluminum, were used as catalysts. In addition, when aluminum alkyl catalysts are used, the resulting alkali metal aluminum hydride may produce a hydrogen product containing some hydrocarbons, such as ethane, ethanol, and butanes. Even more advantageously, utilization of the catalyst system of the invention avoids the inherent process problems attending the use of pyrophorics, such as aluminum alkyls. All of the reactants used in the process of the present invention are sufficiently stable in air to allow charging of a reactor without the complicated use of inert atmospheres. Analysis of the ultimate hydrogen product of the invention by mass spectrometric means reveals no detectable hydrocarbons present therein.

The benefits and advantages of the present invention are more readily understood in the following examples which are merely illustrative and are not intended to limit the scope of the invention.

EXAMPLE 1

In preparing sodium aluminum tetrahydride, 14 g. of aluminum powder which contains 2,000 p.p.m. Ti, and 12 g. of sodium metal were placed in a 250 ml. Magne-Stir reactor fitted with a magnetic stirrer and suitable heating means. About 100 ml. predried toluene was used as an inert carrier for the reaction. In addition, there was added to the reactor 3 wt. percent of 1,4-diazabicyclo(2.2.2) octane and 6 wt. percent of triphenylmethane, weight percent being based on total metals charged. Hydrogen was introduced into the reactor until the pressure reached about 2,500 p.s.i. The temperature of the reactor was maintained at about 150° C. throughout the entire run, with continuous agitation of the reactor. Pressure was maintained by addition of hydrogen when the pressure dropped to at least 2,000 p.s.i. The total hydrogen pressure drop was recorded during the run. When hydrogen uptake ceased, the reaction was considered essentially complete. Total reaction time was 7 hours with a hydrogen uptake of about 2,700 pounds. Sodium aluminum hydride was recovered at a yield of over 90 percent with a purity of 93 percent. The sodium aluminum hydride recovered was treated so as to evolve hydrogen. The hydrogen evolved was collected and analyzed by mass spectrographic means with the amount of carbon compounds present being determined. It was found that no detectable carbon compound was present therein.

EXAMPLE 2

A charge similar to that in example 1 was made to a 250 ml. Magna-Stir reactor which was fitted with a stirrer and suitable heating means. In place of the toluene, there was added to the reactor 100 ml. of Esso Solva 75 (a white oil). The aluminum contained 2,000 p.p.m. Ti. The mole ratio of sodium to aluminum was 1.1 to 1 and the weight percent of Dabco was reduced from 3.0 percent to 2.0 percent. The reactor was pressurized with hydrogen to a level of about 4,500 p.s.i.

The reaction was essentially complete after 3.0 hours, with 3,400 pounds of $H_2$ being consumed, yielding 92 percent $NaAlH_4$. The sodium aluminum hydride recovered was purified by recrystallization in tetrahydrofuran (THF) and treated with water to release the hydrogen. Analysis of the evolved hydrogen revealed no detectable hydrocarbons present therein.

EXAMPLES 3–13

Additional runs were made varying the weight percent of Dabco and alternating the cocatalysts. The preparations were made using varying hydrogen pressure, but maintaining the same general temperature range. A Magna-Stir reactor was employed for each preparation. The general procedure used in examples 1 and 2 were used throughout. The results are in table I.

TABLE I

| Example | Alkali metal | Amount (gms.) | Al[d] amount (gms.) | Dabco (weight percent) | Co-catalyst (weight percent)[a] | $H_2$ pressure (p.s.i.) | Temp. (° C.) | Reaction medium | Yield (percent) | Hydrogen analysis (p.p.m.)[c] | Reaction time (hrs.) |
|---|---|---|---|---|---|---|---|---|---|---|---|
| 3 | Na | 12 | 14 | 3.0 | Triphenyl methane-6.0. | 2,500 | 150 | Toluene | 93 | Pure | 24 |
| 4 | Na | 12 | 14 | 3.0 | Fluorene-6.0 | 2,000 | 150 | do | 92 | do | 8 |
| 5 | Na | 12 | 14 | 4.0 | Thiophene-7.5 | 3,500 | 150 | Octane | 86 | do | 16 |
| 6 | Na | 12 | 14 | 3.0 | α-Picoline-6.0 | 4,500 | 150 | Heptane | 91 | do | 6.5 |
| 7 | Na | 12 | 14 | | α-Picoline-9.0 | 2,500 | 150 | Toluene | 87 | do | 7 |
| 8 | K | 21 | 14 | 3.0 | Triphenyl methane-6.0. | 2,500 | 150 | do | 92 | do | 6 |

Table I — Continued

| | | | | | | | | | |
|---|---|---|---|---|---|---|---|---|---|
| 9 | K | 21 | 14 | 2.0 | Thiophene-4.0 | 3,500 | 150 | do | 83 | do | 6 |
| 10 | Na | 12 | 14 | 4.0 | Triphenyl methane-7.5. | 2,500 | 150 | Trimethyl hexzne. | 93 | do | 7 |
| 11 | Na | 12 | 14 | 1.0 | Triphenyl methane-2.0. | 2,000 | 150 | Octane | 87 | do | 8 |
| 12[b] | Na | 12 | 14 | | Triethyl aluminum. | 2,000 | 140 | Toluene | 89 | Ethane-496, Ethanol-270, Butane-85 | 6 |
| 13 | Na | 12 | 14 | 3.0 | | 2,500 | 145 | do | 76 | Pure | 7 |

[a] Weight percent of catalyst components based on total weight of metals charged.
[b] Example 12 is a run to illustrate hydrocarbon contaminants in H₂ evolved from the NaAlH₄ produced using a triethyl aluminum catalyst. The aluminum contained 2,000 p.p.m. Ti.
[c] Hydrocarbon contaminants measured in parts per million, on a volume basis.
[d] The aluminum used in Examples 3-13 contained the following amounts of either Ti or Zr, the amount based on aluminum used: Example 3 (<10 p.p.m. Ti); 4 (1,900 p.p.m. Zr); 5 (20-50 p.p.m. Ti); 6-9 (2,000 p.p.m. Ti); 10 (200 p.p.m. Ti); 11 (300 p.p.m. Ti); 12 (2,000 p.p.m. Ti); and 13 (2,000 p.p.m. Ti).

The process of this invention has considerable utility and is of great importance for providing a source of high-purity hydrogen. The complex hydrides have been known to be highly effective as selective reducing agents for various organic and inorganic compounds, i.e., in the production of benzylamine from benzonitrile, and the like. However, the alkali metal aluminum hydrides of this invention are particularly valuable as hydrogen sources for military and commercial fuel cells. This is due to the fact that hydrocarbon contaminants in the hydrogen evolved from alkali metal aluminum hydrides produced by known methods occasionally causes deterioration of the fuel cell. Fuel cell life has been at least doubled using the products of this invention.

Having thus described the process of this invention, it is not intended that it be limited except as set forth in the following claims.

What is claimed is:

1. A process for producing alkali metal aluminum hydride capable of evolving hydrocarbon-free hydrogen, which comprises reacting together an alkali metal and aluminum, at a mole ratio of from about 0.9:3 to about 1.1:1, the aluminum containing from about 1,000 to about 20,000 p.p.m. based on the aluminum present, of a metal selected from the group consisting of titanium and zirconium; with hydrogen at a pressure of from about 1,500 p.s.i. to about 4,500 p.s.i., and at a temperature of from about 100° C. to about 180° C., in the presence of (I) a catalyst consisting essentially of (a) from about 0.1 to about 10 weight percent, based on the total weight of alkali metal and aluminum, of 1,4-diazabicyclo(2.2.2)octane and (b) from about 0.1 to about 10 weight percent, based on the total weight of alkali metal and aluminum, of a compound selected from the group consisting of triphenylmethane, indene, thiophene, fluorene, and alpha picoline, and (II) a liquid hydrocarbon reaction medium; and recovering solid, crystalline alkali metal aluminum hydride from said reaction medium.

2. The process of claim 1 wherein the aluminum has at least 1,000 parts per million titanium alloyed therewith.

3. The process of claim 1 wherein the alkali metal aluminum hydride is prepared by reacting together sodium and aluminum, in a mole ratio of from about 1:1 to about 1.1:1, the aluminum containing about 2,000 parts per million titanium; with hydrogen at a pressure of from about 1,500 to about 4,500 p.s.i. and at a temperature of from about 140° C. to about 170° C., in the presence of (I) a catalyst consisting essentially of (a) from about 3.0 to about 7.5 wt. percent of 1,4-diazabicyclo(2.2.2)-octane and (b) from about 0.1 to about 7.5 wt. percent of triphenylmethane, the amount of catalyst being based on the total metals present in the reaction, and (II) a reaction medium consisting essentially of toluene; and recovering solid, crystalline sodium aluminum hydride from said toluene.

4. A cyclic process for preparing an alkali metal aluminum hydride capable of evolving high purity, hydrocarbon-free hydrogen; which comprises conducting the reaction of claim 1, separating from the reaction medium the alkali metal aluminum hydride and recycling the reaction medium and catalyst components in a continuous process for preparing the alkali metal aluminum hydride.

5. The process of claim 1, wherein the alkali metal is sodium.

6. The process of claim 4 wherein the alkali metal is sodium.

7. The process of claim 4 wherein the alkali metal aluminum hydride produced thereby is sodium aluminum hydride.

8. The process of claim 1, wherein said catalyst is present in the reaction system in an amount ranging from about 3.0 to about 7.5 weight percent, based on the total weight of alkali metal and aluminum charged to the system.

9. The process of claim 1 wherein said liquid hydrocarbon reaction medium is toluene.

* * * * *